United States Patent [19]
De Lange

[11] Patent Number: 5,825,938
[45] Date of Patent: Oct. 20, 1998

[54] SYSTEM AND METHOD FOR ENHANCING THE SHARPNESS OF A COLOUR IMAGE

[75] Inventor: Alphonsius A. J. De Lange, Eindhoven, Netherlands

[73] Assignee: U.S. Philips Corporation, New York, N.Y.

[21] Appl. No.: 527,237

[22] Filed: Sep. 12, 1995

[30] Foreign Application Priority Data

Sep. 12, 1994 [EP] European Pat. Off. ............. 94202604

[51] Int. Cl.⁶ ............................ G06K 9/00; G06K 9/48; G06K 9/56; G06K 9/40
[52] U.S. Cl. ......................... 382/263; 382/162; 382/189; 382/199; 382/205; 382/232; 382/255; 382/269; 358/500; 358/532; 358/538
[58] Field of Search ................................ 382/263, 162, 382/189, 199, 205, 255, 266, 232, 269; 358/532, 500, 538

[56] References Cited

U.S. PATENT DOCUMENTS

| | | | |
|---|---|---|---|
| 4,972,256 | 11/1990 | Hirosawa et al. | 358/532 |
| 4,974,071 | 11/1990 | Maeda | 358/539 |
| 5,134,667 | 7/1992 | Suzuki | 382/266 |
| 5,475,812 | 12/1995 | Corona et al. | 395/344 |
| 5,572,652 | 11/1996 | Robusto et al. | 395/326 |

OTHER PUBLICATIONS

"An Objective and Subjective Evaluation of Edge Detection Methods in Images", by J.A.C. Bernsen, Philips J. Res. 46, 57–94, 1991.

*Primary Examiner*—Leo H. Boudreau
*Assistant Examiner*—Daniel G. Mariam
*Attorney, Agent, or Firm*—Leroy Eason

[57] ABSTRACT

A color image is locally discoloured in the vicinity of edges. The edges extend, for example, between a superposed foreground and a background in a computer-generated image, but also between different regions in natural images which are processed, for example, in a television receiver. Consequently, the edges are perceived as being sharper upon display.

10 Claims, 2 Drawing Sheets

SYSTEM AND METHOD FOR ENHANCING THE SHARPNESS OF A COLOUR IMAGE

BACKGROUND OF THE INVENTION

1. Field of the Invention

The invention relates to an image display system, comprising:

an image display device which is arranged to receive an image signal representing an input color image and to display an output color image which is the same as the input color image in a general sense, edge location signalling means for signalling a location in the input color image where an edge is situated between two regions having a different image characteristic, which means are coupled to the image display device which is also arranged to make a color saturation of the output color image locally, in a vicinity of the location, different from that of the input color image.

The invention also relates to a method of forming an image for display, which method comprises the following steps:

receiving an input image signal representing an input color image, signalling an edge location in the input color image where an edge is situated between two regions having a different image characteristic, outputting an output image signal representing an output color image which is the same as the input color image in a general sense but in which a color saturation is changed locally, in a vicinity of the location, relative to the input image.

2. Description of the Related Art

A system of this kind is known from European Patent Application No. 327 107, corresponding to U.S. Pat. No. 4,972,256. The cited Patent Application concerns the display of color images with enhanced image sharpness. Generally speaking, the output color images then remain the same as the input color images, be it that changes are made only around selected locations. In prior art, this is achieved by forming an enhancement factor by way of spatial high-pass filtering from a grey component of the input color image. This enhancement factor is added to the input color image. Near an edge between two regions having different grey components, the region at the "light" side of the edge thus becomes locally lighter with a comparatively less saturated color, and the region at the "dark" side becomes locally darker with a comparatively more saturated color. The image remains unchanged in parts of the input color image in which no distinct edges are present. The strength of the grey component of the edge is thus exaggerated, thus creating the impression of more sharpness.

SUMMARY OF THE INVENTION

It is, inter alia an object of the invention to display color images in such a manner that they are perceived as being sharper by the human eye. This applies notably to computer images in which windows are reproduced against a background or television images on which an "on-screen display" image is superposed for control purposes, or a "Picture-in-Picture" image of two input images, but also to natural images.

The image display system in accordance with the invention is characterized in that the image display device is arranged to make the color saturation of the output image locally smaller, at both sides of the edge, than that of the input color image.

It has been found that this improves the perception of sharpness, notably in the vicinity of edges. Because the human eye perceives spatial color variations less sharply than spatial grey variations, the presence of a color component reduces the sharpness perceived, by reduction of the color saturation, so that the color component is attenuated relative to the grey component and the perception of sharpness is enhanced.

An embodiment of the image display system in accordance with the invention is characterized in that the image display device is arranged to limit the output color image to shades of grey at both sides of the edge. By removing all color from the visible image in the vicinity of the location of the edge, the perception of sharpness is maximized.

The reduction of the color saturation preferably diminishes gradually as the distance from the location is greater; the fact that the output image is a processed version of the input image thus becomes less evident. Beyond a given distance, the input image and the output image are the same.

The invention is notably suitable for systems in which the color component of the image is displayed with a resolution which is lower than that of the intensity component; this is the case in most television systems. Color decoding artefacts, occurring due to edges, are then also rendered less visible.

An embodiment of the invention is characterized in that the location signalling means comprise an edge detector for detecting the edge in the image signal and for measuring the location. The use of an edge detector prevents the occurrence of artefacts in the case of gradual variations in the image characteristic. The system can thus be used for standard image signals such as television signals.

An embodiment of the invention is characterized in that the edge detector is arranged to check a length of the edge and to signal the location only if the edge has at least a predetermined length and/or to check at least one of the two regions in a zone adjacent the edge for the presence of edges and to signal the location only in the absence of an edge. The restriction to edges of minimum length and edges which adjoin an edge-free region prevents the discoloring of "texture" regions with many small edges (for example, a lawn with individually visible blades of grass). The restriction to edges of minimum length, moreover, prevents discoloring in the case of short edges caused by noise.

An embodiment of the invention is characterized in that the image signal represents an underlying image and a superposition image, the input color image corresponding to the underlying image except for a part or parts in which the underlying image has been replaced by the superposition image, and that the edge location signalling means are arranged to signal the location wherever in the input color image the underlying image changes over into the superposition image. Examples of underlying images with superposition images are computer background signals with windows superposed thereon, or television images on which an "On Screen Display" image is superposed for control purposes, or a "Picture-In-Picture" image from a different image source. Upon composition of the image, it is then also known where the edge between the underlying image and the superposed image is situated. In accordance with the invention, the vicinity of this edge is reproduced with less color saturation.

The reduction of the color saturation may be restricted to a small region along the edge; for example, for the display of windows, the contents of the window can be displayed mostly with the normal color saturation.

An embodiment of the invention is characterized in that the location signalling means are arranged to signal the location wherever a color of the image changes over from a predetermined background color to another color. The background color is, for example, that of a specially colored rear wall in the input image, or that of the grass of a soccer pitch. The sharpness of the outline of persons and objects visible against this background color is thus enhanced in a simple manner.

An embodiment of the invention is characterized in that the image display device is arranged to render an intensity of the output image locally lower, in a part of the vicinity of the location, than that of the input color image.

An embodiment of the invention is characterized in that the image display device is arranged to make an intensity transition, in a part of the vicinity of the location, upon crossing of the edge in the output image locally larger than in the input color image.

The edge is displayed with emphasized intensity value in these two manners, whereas the color saturation is present with less emphasis or is even absent. The perception of sharpness is thus also enhanced.

The method of the invention is characterized in that at both sides of the edge, the color saturation of the output image is locally rendered lower than that of the input color image. The output image thus formed can be transmitted, for example, via the air or a cable system for reception and display in television receivers.

BRIEF DESCRIPTION OF THE DRAWINGS

These and other aspects of the invention will be apparent from and elucidated with reference to the embodiments described hereinafter. In the drawings.

DESCRIPTION OF THE PREFERRED EMBODIMENTS

Figure 1:
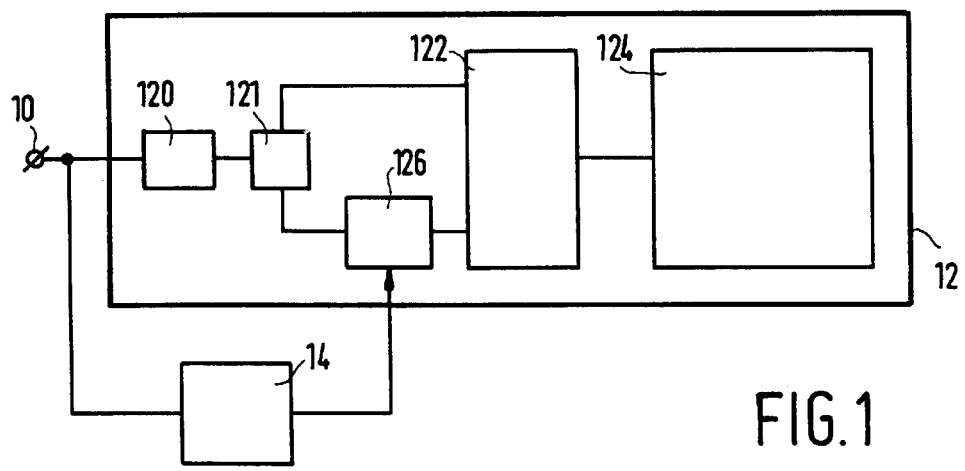
FIG. 1 shows a first embodiment of an image display system in accordance with the invention.

FIG. 1 shows an image display system in accordance with the invention.

The system comprises an input 10 which is coupled to an image display device 12. The input 10 of the image display device 12 is coupled to a color separation unit 121 via a delay member 120. The color separation unit 121 comprises a first and a second output. The first output is coupled directly to an image control unit 122 and the second output is coupled to the image control unit 122 via a controllable color attenuator 126. The image control unit 122 is coupled to a display screen 124.

The system also comprises an edge detector 14, an input of which is coupled to the input 10 of the system and an output of which is coupled to a control input of the controllable color attenuator 126.

During operation, the input 10 receives an image signal which represents the contents of an image line-by-line in the form of a time-dependent signal. This signal is applied, after delay by the delay member 120, to the color separation unit 121 which splits it into an intensity component and a color component (generally comprising two signals). The intensity component is applied directly to the image control unit 122 whereas the color component is applied to the image control unit 122 via the controllable color attenuator 126. The image control unit 122 controls the display screen 124 in such a manner that the represented image is displayed as a function of the location on the display screen 124.

The edge detector 14 receives the image signal from the input 10, detects edges in this image signal and signals such detection at the instant at which the edge occurs in the image signal; this instant represents the location in the image signal in which the edge occurs. The edge detector can detect the occurrence of an edge in the image signal only with some delay. The delay member 120 serves to compensate for this delay and it also introduces some additional delay, so that the signalling of the edge on the control input of the attenuator 126 reaches the attenuator 126 sometime before the edge in the image signal. For the edge detector 14, a generally known edge detector can be used, for example, one of the examples discussed in section 2 of an article by J. Bernsen in "Philips Journal of Research", 46 (1991), pp. 57–94: "An objective and subjective evaluation of edge detection methods in images" and the references included therein.

The amplitude of the color component represents the color saturation of the image. The attenuator 126 attenuates this amplitude in a vicinity of the location (locations) signalled by the detector 14. The image arrives line-by-line on the input of the attenuator 126 and one line thereof contains the signalled location. In order to attenuate the amplitude in a vicinity, the color component is attenuated during an interval from the instant at which the edge detector 14 signals the edge until sometime after the arrival of the edge in the image signal at the attenuator. The attenuation gradually increases as a function of time until it reaches a maximum at the instant at which the edge in the image signal itself arrives at the attenuator, after which the attenuation gradually diminishes again. The color component is also attenuated in one or more lines preceding and succeeding the line in which the location is situated, be it to an extent which is less as the relevant line is situated further from the line in which the location is present.

Preferably, the edge locations are signalled to reduce of the color saturation only if they form part of an edge having at least a predetermined length and/or if no edge detections occur in a region of predetermined size on at least one side adjacent the edge. An increase of the noise is prevented by the restriction to an edge of at least predetermined length. The restriction to edges adjacent a region without edges prevents discoloring of regions of non-uniform texture in the image. Both restrictions can be realized; for example, by way of software by including an elementary edge detector, for example, as described in the cited publication by J. Bernsen, in the edge detector 14 and by topographically storing the detections produced thereby in an image memory.

In order to check whether the edge has at least a minimum length, for example, it is checked whether an edge has also been detected in locations neighboring; a location in which the elementary edge detector has detected an edge; for such a neighboring location, checking is recursively continued until an edge of minimum length has been found, the location then being signalled. Signalling is omitted if no neighboring location with a detection is recursively found before the minimum length is reached. Alternatively, such a check can also be performed by means of known template matching techniques.

In order to check whether a detection-free region occurs adjacent the edge, the direction of the edge is determined and, for example, a rectangular region is chosen which extends parallel to this direction and is situated at a few pixels from the edge in a direction transversely of the edge. This region is checked for the absence of detections; if such detections are absent, the edge is signalled, and otherwise it is not. Alternatively, this can also be performed by means of template matching techniques.

Instead of an edge detection function, as described in the cited article by J. Bernsen, the edge detector 14 can also perform a background/foreground detection. This is realized, for example, by comparing the Euclidean distance between the color and/or intensity value of the input image and a predetermined value with a threshold value. An edge location is then signalled in a location having both neighboring locations in which this distance exceeds the threshold value and neighboring locations in which this distance is below the threshold value (neighboring locations may include the location itself).

Figure 2:
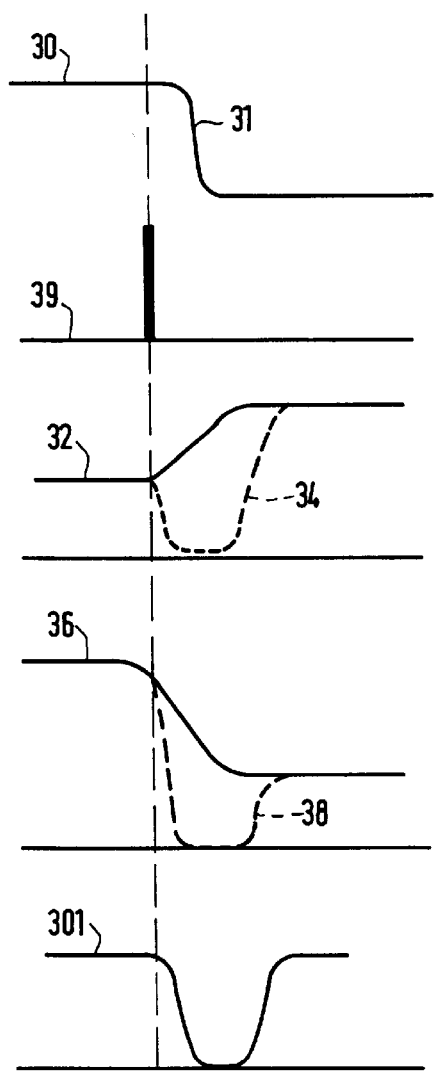
FIG. 2 shows image contents in a section of an image.

FIG. 2 shows different aspects of the image signal as a function of time. The Figure concerns the line of the image signal in which the location is present and shows the following signals: the intensity component 30 of the image signal, two color components 32, 36 of the image signal, and the signal 39 signalling the location of the edge. The Figure also shows an attenuation profile 301. The edge corresponds to an intensity transition 31 in the intensity component 30. The arrival of this transition is preceded by a signalling pulse in the edge signalling signal 39. In response to this pulse, the two color components are temporarily attenuated. The attenuated color components 34, 38 are denoted by dashed lines. At the area of the transition, no color component remains for the time being. On the lines situated adjacent the line in which the location is present, the color components are attenuated in a similar manner, be it that the attenuation is less as the lines are situated further from the line in which the location is present.

In order to realize the attenuation, the color components in the line in which the location is present are, for example, multiplied by a time-dependent attenuation profile 301. The attenuation profile 301 is shaped, for example, as an inverted bell or as a trapezium with first a linear increase of the attenuation, subsequently a constant attenuation and, after that a linear decrease of the attenuation. When a standard television monitor is used (resolution 625 lines per screen), the overall length of the trapezium corresponds, for example, to 5 pixels with a constant level of 1 pixel before and after the location.

The image control unit 122 and the display screen 124 convert these signals into a visible image which has been discolored in a vicinity of the edge. Discoloring is, for example, complete but the sharpness enhancing effect already commences in the case of partial discoloring. Furthermore, the FIGS. 1 and 2 are detailed, only by way of example, in terms of an intensity component and a color component. Evidently, the invention can be used equally well for other representations of color information, for example, RGB components.

Figure 3:
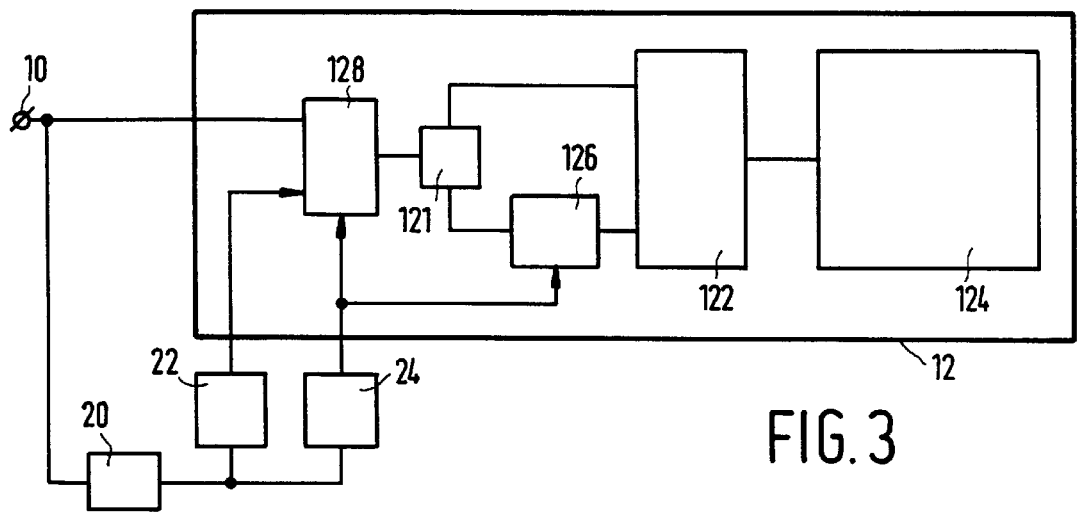
FIG. 3 shows a second embodiment of an image display system in accordance with the invention.

FIG. 3 shows a second image display system in accordance with the invention. It deviates from the image display system shown in FIG. 1 notably as regards the signalling of the edge. Components which correspond to FIG. 1 are denoted by the same reference numerals as used in FIG. 1.

The system comprises an input 10 which is coupled to an image display device 12. The input 10 of the image display device 12 is coupled to a color separation unit 121 via a multiplexer 128. The color separation unit 121 comprises a first and a second output. The first output is coupled directly to an image control unit 122 whereas the second output is connected to the image control unit 122 via a controllable color attenuator 126. The image control unit 122 is coupled to a display screen 124.

The input 10 is also coupled to an address generator 20 which comprises an address output which is coupled to an address input of two image memories 22, 24. A data output of one of the memories is coupled to the color separation unit 121 via the multiplexer 128. A data output of the second memory is coupled to a control input of the multiplexer 128 and to the control input of the color attenuator 126.

The address generator 20 forms successive address values from the image signal during operation, each address corresponding to the location represented by the image signal at the instant of formation of the address. In response to the address, information is read from the memories 22, 24. The information from one memory (22) represents a superposition image intended to replace locally the underlying image represented by the image signal on the input. The information from the second memory (24) indicates where the superposition image is to replace the underlying image.

The information from the one memory 22 may describe, for example, a window with information which is to be superposed on the underlying image, or On Screen Display information.

The information from the second memory 24 controls the multiplexer 128 in order to pass on alternately the image signal received on the input 10 and the information from the one memory 22. The information from the second memory 24 also serves to control the color attenuator 126, so that the color saturation is locally reduced, as described with reference to FIG. 2, before and after the alternation between the image signal received on the input 10 and the information from the one memory 22.

Figure 4:
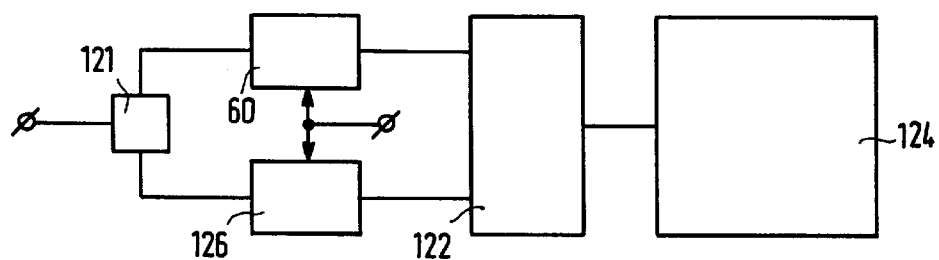
FIG. 4 shows an image display device for use in a system in conformity with a further aspect of the invention.

FIG. 4 shows an image display device for use in a system in conformity with a further aspect of the invention. This device corresponds mainly to the devices shown in the FIGS. 1 and 3 and corresponding components are denoted by corresponding reference numerals.

The difference with respect to the FIGS. 1 and 2 consists in that the first output of the color separation unit 21 is not coupled directly to an image control unit 122, but via a controllable intensity adapter 60. The control input of the intensity adapter 60 is coupled to the control input of the color attenuator 126.

During operation, the intensity adapter 60 also adapts the intensity component near the signalled edges.

Figure 5A:
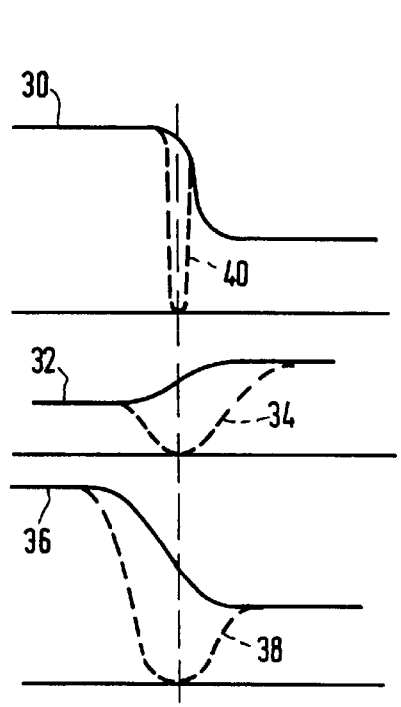
FIGS. 5a and 5b show further image contents in a section of an image.
Figure 5B:
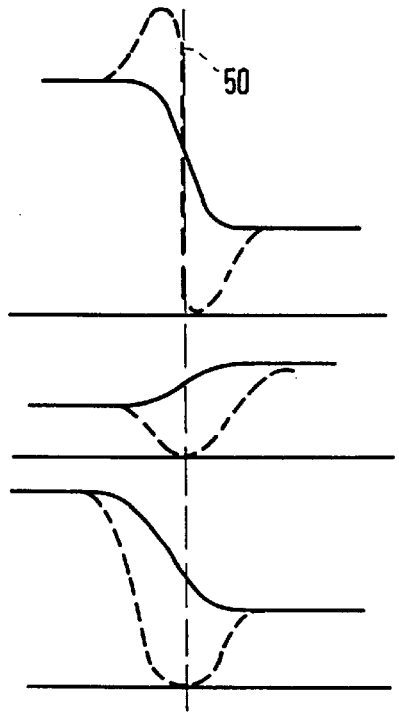

FIGS. 5a and 5b show two feasible adaptations of the intensity component 30. In FIG. 5a the adapted intensity component has been locally reduced to zero in a vicinity of the edge which is smaller than the vicinity of the edge in which the color saturation is reduced. In the output image this creates the impression of a black line emphasizing the edge.

At the side of the edge having the highest intensity in FIG. 5b, the adapted intensity component 50 is gradually made stronger than in the original image signal as the edge is approached; at the side of the edge having the lowest intensity, the adapted intensity component 50 is gradually made less strong than in the original image signal as the edge is approached. In the output image, this creates the impression of an exaggerated edge which makes the edge seem sharper.

Even though the invention has been described on the basis of an independent color image, such as displayed on a television/computer monitor and on a printer, it will be apparent that the invention can also be used for moving images represented by a series of separate color images. This is advantageous notably because in moving images, an impression of artificiality, sometimes created by accentuation of the edges, is less evident.

The invention can be used wherever the sharpness of images is to be automatically enhanced, for example, in a computer system, in a television receiver, in a camera, in an image printer, or in a distribution center for image signals, such as a video-on-demand center.

I claim:

1. An image display system, comprising:

an image display device which is arranged to receive an image signal representing saturation levels of color components of an input color image and to display an output color image which is the same as the input color image in a general sense; and edge location signaling means for signaling a location in the input color image where an edge is situated between two regions having a different image characteristic, said edge location signaling means being coupled to the image display device;

the image display device being arranged to produce locally, in a vicinity of said edge location, saturation levels of color components of the output color image which are different from the saturation levels of said color components of the input color image in said vicinity;

characterized in that the image display device is arranged to produce locally, in the vicinity of said edge location and at both sides thereof, saturation levels of said color components of the output color image which are reduced below the saturation levels of said color components in the input color image, regardless of the color of said color components in the input color image.

2. An image display system as claimed in claim 1, characterized in that the image display device is arranged to limit the output color image to shades of grey at both sides of the edge.

3. An image display system as claimed in claim 1, characterized in that the location signalling means comprise an edge detector for detecting the edge in the image signal and for measuring the location.

4. An image display system as claimed in claim 3, characterized in that the edge detector is arranged to check a length of the edge and to signal the location only if the edge has at least a predetermined length and/or to check at least one of the two regions in a zone adjacent the edge for the presence of edges and to signal the location only in the absence of an edge.

5. An image display system as claimed in claim 1, characterized in that the image signal represents an underlying image and a superposition image, the input color image corresponding to the underlying image except for a part or parts in which the underlying image has been replaced by the superposition image, and that the edge location signalling means are arranged to signal the location in any line of the input color image where the input image changes over from representing the underlying image on one side of the location into representing the superposition image on the other side of the location.

6. An image display system as claimed in claim 5, characterized in that the part or the parts in which the underlying image has been replaced by the superposition image are larger than a vicinity of the location in which the color saturation of the output image is made less than in the input color image.

7. An image display system as claimed in claim 1, characterized in that the location signalling means are arranged to signal the location in any line of the input color image where a color of the input image changes over from a predetermined background color on one side of the location to another color on the other side of the location.

8. An image display system as claimed in claim 1, characterized in that the image display device is arranged to render an intensity of the output image locally lower, in a part of the vicinity of the location than that of the input color image.

9. An image display system as claimed in claim 1, characterized in that the image display device is arranged to make an intensity transition, in a part of the vicinity near the location, upon crossing of the edge in the output image locally larger than in the input color image.

10. A method of forming an image for display, said method comprising the following steps:

receiving an input image signal representing saturation levels of color components of an input color image;

signaling an edge location in the input color image where an edge is situated between two regions having a different image characteristic; and outputting an output image signal representing saturation levels of color components of an output color image which is the same as the input color image in a general sense but in which said color saturation levels are changed locally, in a vicinity of the edge location, relative to the input image;

characterized in that in said vicinity of the edge location and at both sides thereof the saturation levels of said color components of the output image are reduced below the saturation levels of said color components of the input color image, regardless of the color produced by said color components in the input color image.

* * * * *